(12) United States Patent
Lewis et al.

(10) Patent No.: US 7,578,993 B2
(45) Date of Patent: Aug. 25, 2009

(54) PROCESS FOR PREPARING CRYSTALLINE ALUMINOSILICATE COMPOSITIONS USING CHARGE DENSITY MATCHING

(75) Inventors: Gregory J. Lewis, Mount Prospect, IL (US); Mark A. Miller, Niles, IL (US); Jaime G. Moscoso, Mount Prospect, IL (US); Ben A. Wilson, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 523 days.

(21) Appl. No.: 10/978,001

(22) Filed: Oct. 29, 2004

(65) Prior Publication Data
US 2005/0095195 A1     May 5, 2005

Related U.S. Application Data

(60) Provisional application No. 60/516,364, filed on Oct. 31, 2003.

(51) Int. Cl.
*B01J 29/70*     (2006.01)
(52) U.S. Cl. ..................................... 423/703
(58) Field of Classification Search .................. 423/703
See application file for complete search history.

(56) References Cited

U.S. PATENT DOCUMENTS

| | | | |
|---|---|---|---|
| 5,489,424 A | 2/1996 | Balkus, Jr. et al. | 423/702 |
| 6,419,895 B1 | 7/2002 | Lewis et al. | 423/718 |
| 6,632,417 B2 | 10/2003 | Elomari | 423/706 |
| 2003/0211034 A1 | 11/2003 | Wilson et al. | 423/713 |

OTHER PUBLICATIONS

A. Corma et al, *Nature* 418 (2002) pp. 514-517.
P. Wagner et al, *Chem. Comm.* (1997) 2179-2180.
R.F. Mortlock et al, *J. Phys. Chem.* 95 (1991) 372-378.

*Primary Examiner*—David M Brunsman
(74) *Attorney, Agent, or Firm*—Frank S. Molinario

(57) ABSTRACT

A process for preparing crystalline alumino-silicate compositions has been developed. The process involves preparing a charge density mismatch reaction mixture comprising sources of aluminum, silicon, optionally an E metal and at least one charge density mismatch (CDM) template. The CDM template is an organic nitrogen containing template, in the hydroxide form, e.g. tetraethylammonium hydroxide and is characterized in that it is incapable of inducing crystallization. To this mixture there is added a solution comprising a second templating agent termed a crystallization template (CT). The CT can be an organic template different from the CDM template, an alkali metal, an alkaline earth metal and mixtures thereof.

20 Claims, No Drawings

PROCESS FOR PREPARING CRYSTALLINE ALUMINOSILICATE COMPOSITIONS USING CHARGE DENSITY MATCHING

CROSS-REFERENCE TO RELATED APPLICATION

This application claims priority from Provisional Application Ser. No. 60/516,364 filed Oct. 31, 2003, the contents of which are hereby incorporated by reference.

FIELD OF THE INVENTION

This invention relates to a process for preparing crystalline aluminosilicate compositions. The process comprises first forming a reactive synthesis reaction mixture, preferably a solution, containing sources of aluminum, silicon, optionally an E metal (e.g. gallium), and at least one organic templating agent in the hydroxide form that is incapable of inducing crystallization of the aluminosilicate composition, and adding to this a solution comprising a second templating agent selected from the group consisting of organic templating agents, alkali metals, alkaline earth metals, or mixtures thereof, and reacting the resultant mixture at a temperature and for a time to crystallize the aluminosilicate composition.

BACKGROUND OF THE INVENTION

The quest for new zeolitic materials has recently focused on the design of new organoammonium templates, i.e. structure directing agents (SDA), often expensive and complicated molecules that impart aspects of their structural features to the zeolite to yield a desirable pore structure. See, e.g. A. Corma et al, *Nature* 418 (2002) pp. 514-517; P. Wagner et al, *Chem. Comm.* (1997) 2179-2180; U.S. Pat. Nos. 5,489,424 and 6,632,417 B2. With goals of designing spatial features such as large pores or intersecting channels within the zeolite, many of these organoammonium SDA's are necessarily large molecules of low charge density and have thus been accompanied by a focus on low charge density (i.e., high silica) frameworks. It would be economically advantageous to use commercially available organoammonium SDAs to synthesize new zeolites. A potential way to use commercially available SDA is to use two or more templates to form a single structure. This approach, however, would likely fail at high Si/Al ratios, because each template will be present in large excess relative to the framework charge to be balanced, each leading to its own product. Low Si/Al ratios present a better situation to pursue template cooperation because there is more framework charge to balance, allowing more reasonable template/Al ratios.

Low Si/Al (Si/Al<10) ratio chemistry has traditionally been carried out in a gel phase dominated by the significant presence of alkali cations, which play an important role in structure direction. Low Si/Al ratio organoammonium-based aluminosilicate reaction mixtures are known to form solutions rather than gels like their alkali-based analogs see, R. F. Mortlock et al, *J. Phys. Chem.* 95 (1991) 372-378. This is a matter of solubility as the high charge density on aluminosilicate solution species are not predisposed to form a gel network with the low charge density organoammonium cations. This Charge Density Mismatch (CDM) also leads to difficulty in zeolite crystallization, because of the enormous spatial requirements for the number of low charge density organoammonium cations to be accommodated in the pores of a high charge density framework. Applicants have found that adding controlled amounts of at least one second template with a better match in charge density to the CDM aluminosilicate reaction mixture will induce crystallization of an aluminosilicate composition via a cooperative interaction between the templates.

Thus, applicants have developed a process for synthesizing aluminosilicate compositions which comprises purposely forming a fully reactive aluminosilicate reaction mixture, which cannot crystallize, followed by a perturbation of the reaction mixture via the addition of controlled amounts of additional templating agents (organic cations, alkali/alkaline earth cations, or mixtures thereof) which induce crystallization of a zeolite or layered aluminosilicate via a cooperative interaction between the templates. In a preferred embodiment, the process involves preparing a first solution comprising sources of aluminum, silicon, optionally E metals such as gallium, and one organic templating agent in the hydroxide form. This first solution is characterized in that at reaction conditions crystalline aluminosilicate compositions will not crystallize. Adding to the reaction mixture a solution comprising a crystallization inducing templating agent selected from the group consisting of an organic cation (different from the first organic cation) an alkali and/or alkaline earth metal cation and mixtures thereof to form a reaction mixture which is reacted at crystallization conditions to form the a crystalline aluminosilicate composition.

SUMMARY OF THE INVENTION

As stated this invention relates to a process for synthesizing crystalline aluminosilicate compositions including two dimensional layered aluminosilicates and microporous crystalline zeolites. The crystalline aluminosilicate compositions have an empirical composition on an as synthesized and anhydrous basis expressed by an empirical formula of:

$$M_m^{n+}C_g^{h+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 3, C is at least one organic nitrogen containing cation having a C/N>4, characterized in that it is a charge density mismatch template, selected from the group consisting of quaternary ammonium ions, diquaternary ammonium ions, and quaternized alkanolammonium cations, "g" is the mole ratio of C to (Al+E) and varies from 0 to about 5, R is at least one crystallization-inducing organic cation which differs from C and is selected from the group consisting of quaternary ammonium ions, diquaternary ammonium ions, protonated amines, protonated alkanolamines and quaternized alkanolammonium ions, "r" is the mole ratio of R to (Al+E) and has a value from 0 to about 5, where g+r>0.25, "n" is the weighted average valence of M and has a value of about 1 to about 2, "h" is the weighted average valence of C and has a value of about 1 to about 2, "p" is the weighted average valence of R and has a value of about 1 to about 2, E is an element selected from the group consisting of gallium, iron, boron and mixtures thereof, "x" is the mole fraction of E and has a value from 0 to about 1 "y" is the mole ratio of Si to (Al+E) and varies from greater than 1 to about 25; the process comprising forming a charge density mismatch (CDM) reaction mixture containing reactive sources of Al, Si, optionally E and at least one C organic cation in the hydroxide form, adding to this mixture a solution comprising a crystallization inducing templating agent selected from the group consisting of an R organic cation, a source of M and mixtures thereof to provide a final reaction mixture having a composition expressed in terms of mole ratios of the oxides of:

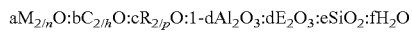

where "a" has a value from 0 to about 5, "b" has a value of about 1 to about 25, "c" has a value from 0 to about 5 c+a>0.15, "d" has a value from 0 to about 1, "e" has a value of about 2 to about 50 and "f" has a value of about 10 to about 5000, and reacting the final reaction mixture at a temperature of about 75° C. to about 225° C. for a time sufficient to form the zeolite.

This and other objects and embodiments will become clearer after a detailed description of the invention.

DETAILED DESCRIPTION OF THE INVENTION

The present invention deals with a process for preparing crystalline aluminosilicate compositions which include three dimensional microporous crystalline zeolites and two dimensional layered aluminosilicates. The zeolites have a framework structure of at least $AlO_2$ and $SiO_2$ tetrahedral units. The crystalline aluminosilicate compositions of the present invention have an empirical composition on an as synthesized and anhydrous basis expressed by the empirical formula of:

$$M_m^{n+}C_g^{h+}R_r^{p+}Al_{1-x}E_xSi_yO_z$$

In the above equation, M represents at least one exchangeable cation and is selected from the group consisting of alkali and alkaline earth metals. Specific examples of the M cations include but are not limited to lithium, sodium, potassium, rubidium, cesium, calcium, strontium, barium and mixtures thereof. C is at least one organic cation, hereinafter referred to as the Charge Density Mismatch template, and is characterized in that it cannot crystallize the aluminosilicate composition from the reaction mixture without supplemental sources of crystallization inducing M or R ions. C is selected from the group of organic cations consisting of quaternary ammonium ions, diquaternary ammonium ions, and quaternized alkanolammonium ions. Preferred C organic cations have at least C/N >4 and preferably C/N>5, non-limiting examples include diethyldimethylammonium, tetraethylammonium, tetrapropylammonium, methyltriethylammonium, tetrabutylammonium, ethyltrimethylammonium, choline, hexamethonium, hexyltrimethylammonium, trimethylbutylammonium and trimethylcetylammonium ions. R is also at least one organic cation (different from C), and is distinguished from C in that it can induce crystallization of the aluminosilicate composition from the reaction mixture, is a higher charge density cation than C, is more likely to be incorporated into the zeolite than C, and is added in a much smaller portion to the reaction mixture than is C. R is an organic cation which is selected from the group consisting of quaternary ammonium ions, diquaternary ammonium ions, protonated amines, protonated alkanolamines and quaternized alkanolammonium ions. Preferred organic cations are quaternary and diquaternary ammonium ions. Non-limiting examples of quaternary ammonium ions are tetramethyl-, ethyltrimethyl-, methyltriethyl, diethyldimethyl-, trimethylbutyl-, and trimethylpropyl-ammonium ions. Non-limiting examples of diquaternary ammonium ions are hexamethonium, pentamethonium, octamethonium, decamethonium, dimethylene bis(trimethylammonium), trimethylene bis(trimethylammonium), methylene bis(trimethylammonium) and tetramethylene bis(trimethylammonium). The value of "n" which is the weighted average valence of M varies from about 1 to about 2. The value of "h" which is the weighted average valence of C varies from about 1 to about 2. The value of "p" which is the weighted average valence of R varies from about 1 to about 2. The ratio of M to (Al+E) is represented by "m", which varies from 0 to about 3, "g" is the ratio of C to (Al+E) and varies from 0 to about 5, while "r" is the ratio of R to (Al+E) and varies from 0 to about 5, with g+r >0.25. The ratio of silicon to (Al+E) is represented by "y" which varies from greater than 1 to about 25. E is an element, which is tetrahedrally coordinated, is present in the framework and is selected from the group consisting of gallium, iron and boron. The mole fraction of E is represented by "x" and has a value from 0 to about 1, while "z" is the mole ratio of O to (Al+E) and is given by the equation $$z=(m\cdot n+g\cdot h+r\cdot p+3+4\cdot y)/2.$$

Where M is only one metal, then the weighted average valence is the valence of that one metal, i.e. +1 or +2. However, when more than one M metal is present, the total amount of $$M_m^{n+} = M_{m1}^{(n1)+} + M_{m2}^{(n2)+} + M_{m3}^{(n3)+} + \ldots$$

and the weighted average valence "n" is given by the equation:

$$n = \frac{m_1 \cdot n_1 + m_2 \cdot n_2 + m_3 \cdot n_3 + \ldots}{m_1 + m_2 + m_3 \ldots}$$

Similarly, when two or more C or R cations are present, the total amount of C and R are given by the equations:

$$R_r^{p+}=R_{r1}^{(p1)+}+R_{r2}^{(p2)+}+R_{r3}^{(p3)+}$$

$$C_g^{h+}=C_{g1}^{(h1)+}+C_{g2}^{(h2)+}+C_{g3}^{(h3)+}$$

and the weighted average valences "p" and "h" are given by the equation $$p = \frac{p_1 \cdot r_1 + p_2 \cdot r_2 + p_3 \cdot r_3 + \ldots}{r_1 + r_2 + r_3 + \ldots}$$

$$h = \frac{h_1 \cdot g_1 + h_2 \cdot g_2 + h_3 \cdot g_3 \ldots}{g_1 + g_2 + g_3 + \ldots}$$

Specific examples of the zeolites which can be prepared using the process of the invention include without limitation UZM-4; UZM-5; UZM-5P; UZM-6; UZM-8; and UZM-9. The definitions and structural characterizations (XRD) of UZM-4 are disclosed in U.S. Pat. No. 6,419,895 B1; those of UZM-5,-5P and 6 in U.S. Pat. No. 6,613,302B1; those of UZM-8 in U.S. Pat. No. 6,756,030 and those of UZM-9 in U.S. Pat. No. 6,713,041 all of which are incorporated by reference in their entirety.

The sources of aluminum include but are not limited to aluminum alkoxides, precipitated aluminas, aluminum metal, aluminum salts and alumina sols. Specific examples of aluminum alkoxides include, but are not limited to aluminum ortho sec-butoxide and aluminum ortho isopropoxide. Non-limiting sources of silica include but are not limited to tetraethylorthosilicate, colloidal silica, and precipitated silica. Sources of the E elements include but are not limited to boric acid, precipitated gallium oxyhydroxide, gallium sulfate, ferric sulfate, and ferric chloride. As stated, the C source is required to be the hydroxide form of the organic cation. Specific examples include without limitation tetrapropylammonium hydroxide, tetraethylammonium hydroxide, methyltriethylammonium hydroxide, diethyldimethylammonium hydroxide, hexamethonium dihydroxide and ethyltrimethylammonium hydroxide. The resulting CDM reaction mixture should not be capable of crystallizing a crystalline aluminosilicate composition at the reaction temperatures at which the aluminosilicate synthesis is carried out, usually in the range of about 75° C. to about 200° C.

The CDM reaction mixture which comprises reactive sources of the desired components can be described in terms of molar ratios of the oxides by the formula:

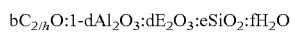

$$bC_{2/h}O:1\text{-}dAl_2O_3:dE_2O_3:eSiO_2:fH_2O$$

"b" varies from about 1 to about 25, "d" varies from 0 to about 1, "e" varies from about 2 to about 50, and "f" varies from about 10 to 5000. When alkoxides are used as the aluminum and silicon source, the CDM reaction mixture is preferably heated to a temperature of about 25 to about 100° C. for a time sufficient to distill at least a portion of the alcohol formed as a byproduct of the hydrolysis reaction, often under vacuum. After distillation, the CDM reaction mixture can optionally be aged at a temperature of about 50 to about 100° C. for a time of about 2 hours to about 7 days. When the CDM mixture is prepared with aluminum and silicon sources other than alkoxides, i.e. silica sol, fumed silica, precipitated silica, alumina, the CDM reaction mixture is preferably heated to a temperature of about 50 to about 100° C. for a time of about 2 hr to about 2 weeks to ensure the formation of a homogeneous solution.

To this CDM reaction mixture there is admixed a solution comprising a crystallization inducing templating agent selected from the group consisting of an R organic cation, a source of M and mixtures thereof. This second organic cation and M metal cations are termed crystallization templates (CT), because these are the species that induce crystallization in the previously uncrystallizable CDM reaction mixture. The sources of R can be without limitation the halides, e.g. chlorides, carbonates, acetates or hydroxides with the halides preferred. Sources of M include without limitation the halides, hydroxides, acetates etc.

An important part of the invention is the decoupling of the species involved in forming a reactive mixture (the CDM reaction mixture) and the species necessary to crystallize the reaction mixture—the CTs. The ability to control the concentration of the CTs, which are potent crystallization inducing agents, allows one to observe cooperation between the CDM template and the CTs that are not possible when the CTs are embedded in the silica, alumina, or the main hydroxide sources. The level of organic cation (CT) R, added to the CDM reaction mixture is given by "c", which represents the ratio of R to (Al+E) and varies from 0 to about 5, while M, the alkali or alkaline earth metals added as CTs are added to the CDM reaction mixture at a level given by "a", which represents the mole ratio of M to (Al+E) and varies from 0 to about 5, where a+c>0.15. Preferred values for "a" and "c" vary from 0 to 1 and most preferably from 0 to about 0.5, especially at Si/Al ratios less than 10. The higher values in the range for "a" and "c" are encountered at Si/Al ratios greater than 10 as Al concentrations become lower. The resultant final reaction mixture is now reacted at a temperature of about 75° C. to about 225° C. and preferably at about 100° C. to about 150° C. for a time sufficient to crystallize the zeolite. Usually this time is from about 12 hr to about 28 days and preferably from about 2 days to about 14 days. The reaction is usually carried out in a sealed vessel under autogenous pressure. After crystallization is complete, the solid product is isolated from the heterogeneous mixture by means such as filtration or centrifugation, and then washed with deionized water and dried in air at temperatures from ambient up to about 100° C.

In order to more fully illustrate the invention, the following examples are set forth. It is to be understood that the examples are only by way of illustration and are not intended as an undue limitation on the broad scope of the invention as set forth in the appended Claims.

EXAMPLE 1

In order to determine the range of concentration and conditions under which a CDM reaction mixture can exist, i.e., as a solution which does not crystallize or is very hard to crystallize, several experiments were carried out. The potential CDM reaction mixtures were prepared using tetramethyl (TMA), tetraethyl (TEA) or tetrapropyl (TPA) ammonium hydroxide; aluminum tri-sec-butoxide and tetraethylorthosilicate (TEOS). The Si/Al ratios were 2, 5, 10, 25 and 50 at OH$^-$/Si ratios of 0.8 and 0.4. The water content was at a ratio of 35 H$_2$O/Si for all experiments. Finally, the reaction mixtures were reacted at 100° C., 150° C. and 200° C. for various times to determine if the mixtures would crystallize. The results from these experiments are presented in Table 1.

TABLE 1

Crystallization Products of Various Potential Charge Density Mismatch Reaction Mixtures

| EX | SDA | OH$^-$/Si | Si/Al | Soln (Y, N) | 100° C. Products (days) | 150° C. Products (days) | 200° C. Products (days) |
|---|---|---|---|---|---|---|---|
| 1a | TMA | 0.4 | 50 | Y | Gel (7) | RUT (7) | RUT (7) |
| 1b | | | 25 | Y | Gel (24) | RUT (7) | RUT, MTN (7) |
| 1c | | | 10 | Y | Gel (24) | Gel, AM (7, 11) | Gel, AM (7, 11) |
| 1d | | | 5 | Y | Gel (15) | Gel, AM (6) | Gel, AM (6) |
| 1e | | | 2 | N | Col (9) | SOD, AM (6) | LAS (6, 12) |
| 1f | | 0.8 | 50 | Y | SOD, TMA$_8$Si$_8$O$_{20}$(10) | SOD, TMA$_8$Si$_8$O$_{20}$(5) | MTN, RUT (5) |
| 1g | | | 25 | Y | SOD, TMA$_8$Si$_8$O$_{20}$(10) | SOD, TMA$_8$Si$_8$O$_{20}$(5) | RUT, MTN (5) |
| 1h | | | 10 | Y | Col (9); SOD (27) | Soln (5); SOD (17) | RUT, SOD (5) |
| 1i | | | 5 | Y | Gel (6) | SOD (6) | AM (6) |
| 1j | | | 2 | Y | Gel (6) | GIS, SOD (6) | SOD (6) |
| 1k | TEA | 0.4 | 50 | Y | Col (8); BEA, AM (14) | AM, BEA (6); BEA, MTW (15) | AM, BEA (6); AM (14) |
| 1l | | | 25 | Y | AM, BEA (13) | BEA (6) | AM (6, 15) |
| 1m | | | 10 | Y | Gel (24) | AM (6, 15) | AM (6, 15) |
| 1n | | | 5 | Y | Gel (16) | Col (5, 11) | LAS (5, 11) |

TABLE 1-continued

Crystallization Products of Various Potential Charge Density Mismatch Reaction Mixtures

| EX | SDA | OH$^-$/Si | Si/Al | Soln (Y, N) | 100° C. Products (days) | 150° C. Products (days) | 200° C. Products (days) |
|----|-----|-----------|-------|-------------|-------------------------|-------------------------|-------------------------|
| 1o |     |           | 2     | N           | Gel (13)                | Col (5, 11)             | LAS (5, 11)             |
| 1p |     | 0.8       | 50    | Y           | Soln (21)               | AM (5, 13)              | AM (5, 13)              |
| 1q |     |           | 25    | Y           | Soln (26)               | BEA (5, 13)             | AM (5, 13)              |
| 1r |     |           | 10    | Y           | Soln (26)               | Soln (5); AM (10)       | AM (5, 13)              |
| 1s |     |           | 5     | Y           | Soln (13)               | Soln (6, 13)            | Gel (6); LAS (13)       |
| 1t |     |           | 2     | Y           | Soln (13)               | Soln (6, 13)            | LAS (6, 13)             |
| 1u | TPA | 0.8       | 5     | Y           | Soln (26)               | Soln (5, 13)            | Soln (5, 13)            |
| 1v |     |           | 2     | Y           | Soln (26)               | Soln (5, 13)            | Soln (5, 13)            |

In the table above, the abbreviations have the following meaning: Col=colloidal, too little solid to isolate; AM=Amorphous; Soln=homogenous solution; Gel=assumed amorphous, LAS=layered aluminosilicate with octahedral Al. The products are listed by abundance.

The results in Table 1 show that reaction mixtures prepared with TMA form solid products, although not all of them are crystalline (Examples 1a-1j). The formation of crystalline and solid products indicate that there is significant aluminosilicate network formation and thus TMA cation is not a preferred SDA for preparing a CDM reaction mixture. For TEA cation, examples 1k-1t, several aspects of Charge Density Mismatch reaction mixtures are illustrated. First, in examples 1k-1o at the lower hydroxide level of OH$^-$/Si=0.4, crystalline or amorphous materials are isolated, aluminosilicate networks are formed. However, as shown in examples 1p-1t, solutions are attained after reaction at 100° C. and 150° C. at Si/Al ratios of 10 or less at the higher hydroxide level of OH$^-$/Si=0.8. Hence, a certain amount of hydroxide is necessary to maintain a level of aluminosilicate network depolymerization. Once this level of hydroxide is obtained, then it is the Charge Density Mismatch which maintains a solution state, actively preventing network formation and crystallization. This is seen by comparing with the results from the TMA reactions, examples 1f-1j, also at OH$^-$/Al=0.8, which formed no solutions after reaction, because the higher charge density TMA cation promotes poorer solubility and network formation.

Another point that is illustrated about the CDM reaction mixtures is their stability with respect to temperature. In examples 1p-1t, solutions for the most part are obtained at 100° C. and 150° C., while at 200° C., solid products are isolated. All of the aluminosilicate solutions reacted in this study initially consisted of aluminosilicate anions which were balanced by the organic template cations. Crystallization and network formation requires that these aluminosilicate anions approach each other and condense through dehydration and dehydroxylation processes. However, in a CDM reaction mixture, the positively charged CDM template stands in the way of this close approach of aluminosilicate anions, forming a double-layer barrier to this condensation. This double-layer barrier can be overcome if sufficient energy is applied, in the form of a higher reaction temperature. Thus for the reactions in examples 1r-1t, which were solutions and CDM reaction mixtures at 150° C., they form solids and are not suitable CDM reaction mixtures at 200° C. Finally, the larger and lower charge density TPA cation, in examples 1u and 1v, illustrates this point with respect to temperature as solutions form at all temperatures and Si/Al ratios tested, even after reaction at 200° C. for nearly 2 weeks. Hence, the barrier to aluminosilicate anion polymerization processes erected by TPA leads to superior CDM reaction mixtures.

EXAMPLE 2

In this set of experiments CDM reaction mixtures were prepared as in example 1, except that only TEAOH was used as the CDM template. To these mixtures, crystallization templates (CTs) were added and the final mixture reacted at different temperatures and times. The CTs used were TMA, sodium or lithium either alone or in combination, added as chloride salts. The results of these experiments are presented in Table 2.

TABLE 2

Effect of Different Crystallization Templates on Tetraethylammonium CDM Mixtures

|    | Si/Al | TEAOH/Si | TMA$^+$/Al | CT, CT/Al | Products (temperature, time) |
|----|-------|----------|------------|-----------|------------------------------|
| 2a | 20    | 0.75     | 1          | —         | BEA (150° C., 7 d)           |
| 2b | 16.2  | 1        | 1          | —         | BEA, UZM-5 (150° C., 3 d)    |
| 2c | 11.5  | 1        | 1          | —         | BEA, UZM-5 (150° C., 3 d)    |
| 2d | 8     | 1        | 1          | —         | UZM-5 (150° C., 4 d)         |
| 2e | 8     | 1        | 0          | Na, 1     | BEA (150° C., 4 d)           |
| 2f | 8     | 1        | 0.5        | Na, 0.5   | UZM-5 (150° C., 4 d)         |
| 2g | 8     | 1        | 0.5        | Na, 0.5   | UZM-9 (125° C., 8 d)         |
| 2h | 2     | 1.6      | 0          | Li, 1     | ZSM-2, Li-ABW (75, 100, 150° C.; 2-7 d) |
| 2i | 2     | 1.6      | 2          | —         | TMA-GIS (100° C., 150° C., 19-33 d) |
| 2j | 2     | 1.6      | 1          | Li, 0.25  | UZM-4 (125° C., 150° C.; 2 d) |

The results in Table 2 indicate that the Si/Al ratio, a reflection of the framework charge density, the choice of CT and its concentration determine what zeolites are produced. At higher Si/Al ratios (Ex 2a), the combination of TEA and TMA produced zeolite beta (BEA), but below Si/Al=20, the charge density properties of the TEA-TMA combination was no longer a good match to form the BEA framework and the zeolite UZM-5 (UFI) was observed (Ex. 2d). At Si/Al=8, the TEA-TMA system produced UZM-5 (UFI) (Ex. 2d), while under the same conditions, when Na was used as the CT instead of TMA, the zeolite beta framework formed (Ex. 2e). A combination of the TMA and Na as the CTs yielded a preferred form of UZM-5 (Ex. 2f). When the temperature was lowered to 125° C. for the CT combination of Na and TMA at Si/Al=8 (Ex. 2g), the zeolite UZM-9, a high Si/Al ratio version of LTA was isolated. Note that for examples 2d-2g, the fraction of the CDM template in the reaction mixture, TEA/(TEA+TMA+Na) is 0.89, demonstrating the potency of the CTs. This also demonstrates the versatility of the approach since from the same CDM reaction mixture, the addition of small portions of salts can be used to direct the crystallization to a number of different structures. The reactions discussed so far are examples of dual templating, in which the CDM template and the CT templates cooperate to form the zeolite, each being incorporated into the structure. A different templating phenomenon was observed at the lower ratio of Si/Al=2 and OH⁻/Si=1.6. When Li was used as the CT, a mixture of ZSM-2 and Li-ABW were observed (Ex 2h), while when the CT was TMA, the observed product was TMA-GIS (Ex. 2i). However, when the combination of TMA and Li was used as the CTs (Ex. 2j), the product was the zeolite UZM-4 (BPH). This product was not observed when either CT was used alone. This example is different from those above because only the CTs Li and TMA were incorporated in the zeolite, the CDM template, TEA, was not, despite the high fraction of the CDM template in the reaction mixture, TEA/(TEA+Li+TMA)=0.72. This type of templating is called forced cooperative templating, in which TEA has forced TMA and Li to cooperate.

EXAMPLE 3

A set of experiments using TEA as the SDA and TMA and Li as the CTs were carried out to further investigate the Forced Cooperative Templating effect observed in Example 2j. Since the CDM template TEA was not incorporated into the UZM-4 zeolite, the question is whether TEA is required at all for the reaction, or can just TMA and Li together make UZM-4? To test this, the reaction conditions Si/Al=2; OH⁻/Si=1.6; H$_2$O/Si=40; and temperature=150° C. and time=2 days, were kept constant while the relative amounts of the CDM template TEA and the CTs Li and TMA were varied. TEA was always added as the hydroxide, while TMA and Li were added as chlorides unless indicated otherwise. These results are presented in Table 3.

TABLE 3

Products Produced Using Tetraethylammonium as the SDA and TMA/Li as the CTs

| Ex | TEAOH/Al | TMA/Al | Li/Al | Products | CDM fr.[2] | Li fr.[3] |
|---|---|---|---|---|---|---|
| 3a | 0 | 3.2[1] | 0.5 | EDI, Li-ABW, TMA GIS | 0 | 0.14 |
| 3b | 0 | 2.7[1] | 0.5[1] | EDI, Li-ABW, TMA GIS | 0 | 0.16 |
| 3c | 1.2 | 2[1] | 0.5 | Li-ABW, TMA GIS | 0.32 | 0.20 |
| 3d | 2.2 | 1.0[1] | 0.5 | Li-ABW, TMA GIS | 0.59 | 0.33 |
| 3e | 3.2 | 1 | 0.25 | UZM-4 | 0.72 | 0.20 |
| 3f | 3.2 | 1 | 0.375 | UZM-4 | 0.70 | 0.27 |
| 3g | 3.2 | 1 | 0.5 | UZM-4 | 0.68 | 0.33 |
| 3h | 3.2 | 1.25 | 0.25 | UZM-4, TMA SOD | 0.68 | 0.17 |
| 3i | 3.2 | 1.25 | 0.5 | UZM-4, TMA SOD (tr) | 0.65 | 0.29 |
| 3j | 3.2 | 0.75 | 0.75 | Li-ABW, UZM-4 | 0.68 | 0.50 |
| 3k | 3.2 | 0.5 | 1.0 | Li-ABW, EDI, ZSM-2, UZM-4 (tr) | 0.68 | 0.67 |

[1]Added as hydroxide;
[2]CDM fr. = CDM template fraction = TEA/(TEA + TMA + Li);
[3]Li fr. = Lithium CT fraction = Li/(Li + TMA)

What is observed from Table 3 is that eliminating (Ex. 3a-3b) or reducing (Ex. 3c-3d) the amount of TEA substantially and substituting just TMA and Li produced product mixtures containing EDI, Li-ABW and TMA-GIS instead of UZM-4. Product mixtures containing Li-ABW and TMA-GIS indicate that the Li and TMA are acting independently to give their own products, as seen above in examples 2h and 2i respectively (Table 2). According to Table 3, the CDM template fraction, TEA/(TEA+TMA+Li) needs to be above 0.60 for UZM-4 to form under these reaction conditions (Ex. 3e-3g). Only then is the cooperation between Li and TMA necessary to make UZM-4 observed. This then is Forced Cooperative Templating, in which the CDM template by virtue of its high concentration and inability to initiate condensation processes can force two strongly structure directing CTs, present at much lower concentration, to cooperate to form a single structure. Table 3 also indicates that the balance between the CTs' concentrations is also important in determining conditions for cooperation. Li cation, because of its smaller size and higher charge density is a stronger structure directing agent, i.e. templating agent, than TMA and needs to be present in lower concentration than TMA to achieve cooperative results that lead to the formation of UZM-4. If Li is too high, it will dominate the product formation and Li-based materials such as Li-ABW, EDI and ZSM-2 were formed along with UZM-4 (ex. 3j and 3k). On the other hand adding too much TMA leads to TMA-GIS in addition to UZM-4 (Ex. 3h and 3i). Hence, without wishing to be bound by any particular theory, two important principles of this invention are illustrated in this example. First, decoupling the formation of a reactive zeolite reaction mixture from its crystallization by the use of CDM templates, CDM reaction mixtures and CTs, allows one to make new materials that are not possible by the use of CTs alone. Second, a qualitative rule of thumb for creating conditions favorable for cooperative templating is that the concentration of a template should be qualitatively inversely proportional to its charge density or structure directing power, otherwise the more strongly structure directing CTs will dominate the chemistry and cooperative templating of the two kinds observed here will not occur. In this system, this would put TEA with the greatest concentration, TMA at the next highest and Li at the lowest concentration. Finally, at Si/Al<10, the sum of the CTs stoichiometry should not significantly exceed that of Al.

EXAMPLE 4

A CDM mixture was prepared using TEAOH, diethyldimethylammonuim hydroxide (DEDMAOH), aluminum tri-sec-butoxide and silicon tetra-ortho-silicate. To this there was added a solution containing TMACl and NaCl to give a reaction mixture having a composition of 3.32 TEAOH:0.83 DEDMAOH:0.5 TMACl:0.5 NaCl:8.3 Si(OEt)$_4$:Al(Osec-Bu)$_3$ 116 H$_2$O. The mixture was reacted at 98° C. for 10 days after which the solid product was isolated and identified as UZM-9. Elemental analysis gave ratios of Si/Al=5.48; Na/Al=0.17; Na/Al=0.98 and C/N=5.36. Since the C/N was greater than 4, it indicated that DEDMA or TEA or both in addition to TMA were incorporated in the zeolite. Ion chromatography was carried out on a dissolved sample and showed the presence of Na, TMA, DEDMA and TEA in the UZM-9 structure, indicating the cooperation of these four templates in making this high Si/Al ratio LTA topology material. While in systems with TMA and Na as the templates a maximum Si/Al ratio of 3.5 is isolated, using small amounts of Na and TMA as CTs and TEA and DEDMA as the CDM templates allows the incorporation of TEA and DEDMA and the attainment of the high Si/Al=5.48 that distinguishes UZM-9 from lower Si/Al LTA topology materials.

EXAMPLE 5

A series of experiments were conducted as in example 2 whereby the CDM template and the CTs were varied to illustrate the strength and versatility of this approach. These experiments are summarized in Table 4.

TABLE 4

Effect of SDA and CTs on Zeolite Synthesis

| EX | CDM, CDMOH/Si | CT, CT/Al | Structure (temp, time) |
|---|---|---|---|
| 5a | TEA, 1.6 | TMA, 1; Li, 0.5 | UZM-4 (125° C., 2 d) |
| 5b | TPA, 1.6 | TMA, 1; Li, 0.5 | UZM-4, LAS (175° C., 2 d) |
| 5c | DEDMA, 1.6 | TMA, 1; Li, 0.5 | UZM-4, LAS (175° C., 2 d) |
| 5d | TEA, 1.6 | HM, 0.5; Li, 0.5 | UZM-4, LAS (175° C., 2 d) |
| 5e | TPA, 1.6 | HM, 0.5; Li, 0.5 | UZM-4, LAS (200° C., 2 d) |
| 5f | DEDMA, 1.6 | HM, 0.5; Li, 0.5 | UZM-4, LAS (175° C., 2 d) |
| 5g | TEA, 0.8 | TMA, 1: Li, 0.5 | LTA (125-175° C., 1-10 d) |
| 5h | TEA, 0.8 | TMA, 1; Li, 0.2; Sr, 0.15 | UZM-4 (150° C., 3 d) |
| 5i | DEDMA, 1.2[1] | Li, 0.5 | UZM-4 (100° C., 6 d) |
| 5j | Choline, 1.2[1] | Li, 0.5 | UZM-4 (100° C., 6 d) |
| 5k | ETMA, 1.42 | Sr, 0.25 | UZM-4 (150° C., 10 d) |

[1]Si/Al = 5,
HM = hexamethonium;
DEDMA = diethyldimethyl ammonium,
ETMA = ethyltrimethylammonium Examples 5a-5c illustrate the versatility of the CDM approach. It is observed that using the low charge density tetrapropylammonium (TPA) (Ex. 5b) and diethyldimethylammonium (DEDMA) (Ex. 5c) templates as the CDM template, the forced cooperation of TMA and Li to make UZM-4 was achieved just as in the TEA system (Ex. 5a). A small amount of a layered aluminosilicate impurity (LAS) was observed in some of these reactions because of the high temperatures. Similarly, examples 5d-5f illustrate another dimension of versatility of this approach in that by using any one of the CDM templates TEA, TPA, or DEDMA, one can substitute the CT TMA with the hexamethonium dication (HM) and once again get forced cooperation of Li and HM to make UZM-4. Example 5g in Table 4 shows that adjusting the amount of TEAOH also leads to different materials from the same combination of CT templates (compare to Ex 5a). At TEAOH/Si=0.8, half the value used in the UZM-4 preparation, TEA forces Li and TMA to cooperate and form a material with the LTA topology, a topology that is normally observed in the Na-TMA template system. This formulation is augmented slightly in Ex. 5h by replacing a portion of the Li CT with Sr and the result is a shift back to a UZM-4 product. This is a significant result because it allows the synthesis of UZM-4 while using one half of the most expensive reagent in the preparation, TEAOH. This last example also illustrates the power of the CDM approach in that there is critical control over the course of crystallization via the control of the CTs, which represent a very small part of the reaction mixture. Finally, Ex. 5i -5k show it is possible to use a small amount of a single CT, in this case Li or Sr, to help crystallize a CDM reaction mixture to form UZM-4 with the CDM templates DEDMA, choline, and ethyltrimethylammonium (ETMA). In these reactions there is no second organic template among the CTs and they are examples of dual templating, as both the CDM template and the CT (Li or Sr) is incorporated into the zeolite.

What is claimed is:

1. A process for preparing a crystalline aluminosilicate composition having an empirical composition on an as synthesized and anhydrous basis expressed by an empirical formula of:

$$M_m^{n+}C_g^{h+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 3, C is at least one organic nitrogen containing cation, having a C/N>4 characterized in that it is a charge density mismatch template, selected from the group consisting of quaternary ammonium ions, diquaternary ammonium ions, and quaternized alkanolammonium cations, "g" is the mole ratio of C to (Al+E) and varies from 0 to about 5, R is at least one crystallization-inducing organic cation which differs from C and is selected from the group consisting of quaternary ammonium ions, diquaternary ammonium ions, protonated amines, protonated alkanolamines and quaternized alkanolamnionium ions, "r" is the mole ratio of R to (Al+E) and has a value from 0 to about 5, where g+r>0.25, "n" is the weighted average valence of M and has a value of about 1 to about 2, "h" is the weighted average valence of C and has a value of about 1 to about 2, "p" is the weighted average valence of R and has a value of about 1 to about 2, E is an element selected from the group consisting of gallium, iron, boron and mixtures thereof, "x" is the mole fraction of E and has a value from 0 to about 1, "y" is the mole ratio of Si to (Al+E) and varies from greater than 1 to about 25; the process comprising forming a charge density mismatch (CDM) reaction mixture solution containing reactive sources of Al, Si, optionally E and at least one C organic cation in the hydroxide form, adding to this mixture a solution comprising a crystallization inducing templating agent selected from the group consisting of an R organic cation, a source of M and mixtures thereof to provide a final reaction mixture having a composition expressed in terms of mole ratios of the oxides of:

$$aM_{2/n}O:bC_{2/h}O:cR_{2/p}O:1-dAl_2O_3:dE_2O_3:eSiO_2:fH_2O$$

where "a" has a value from 0 to about 5, "b" has a value of 1 to about 25, "c" has a value from 0 to about 5, c+a>0.15, "d" has a value from 0 to about 1, "e" has a value of about 2 to about 50 and "f" has a value of about 10 to about 5000, and reacting the final reaction mixture at a reaction temperature of about 75° C. to about 225° C. for a time sufficient to form the zeolite, wherein the CDM reaction mixture solution is not capable of crystallizing a crystalline aluminosilicate composition at the reaction temperature at which the aluminosilicate synthesis is carried out.

2. The process of claim 1 where M is selected from the group consisting of sodium, potassium, lithium, cesium, calcium, strontium, barium and mixtures thereof.

3. The process of claim 1 where the source of M is selected from the group consisting of halide, nitrate, sulfate, hydroxide, or acetate salts.

4. The process of claim 3 where the source of M is the hydroxide salts.

5. The process of claim 1 where C is selected from the group consisting of tetrapropylammonium, tetraethylammonium, diethyldimethylammonium, methyltriethylammonium, tetrabutylammonium, ethyltrimethylammonium, choline, hexamethonium, hexyltrimethylammonium, trimethylbutylammonium, trimethylcetylammonium ions and mixtures thereof.

6. The process of claim 1 where R is selected from the group consisting of tetramethylammonium, methylene bis(trimethylammonium), dimethylene bis(trimethylammonium), trimethylene bis(trimethylammonium), tetramethylene bis(trimethylammonium), ethyltrimethylammonium, diethyldimethylammonium, hexamethonium, methyltriethylammonium, octamethoriium, decamethonium ions and mixtures thereof.

7. The process of claim 1 where the source of R is selected from the group consisting the halide, acetate, hydroxide and carbonate compounds.

8. The process of claim 7 where the source of R is the halide compound.

9. The process of claim 1 where the aluminum source is selected from the group consisting of aluminum isopropoxide, aluminum sec-butoxide, precipitated alumina and aluminum metal.

10. The process of claim 1 where the silicon source is selected from the group consisting of tetraethylorthosilicate, silica sol, fumed silica, precipitated silica and mixtures thereof.

11. The process of claim 1 where the E sources are selected from the group consisting of boric acid, gallium oxyhydroxide, gallium sulfate, ferric sulfate, ferric chloride and mixtures thereof.

12. The process of claim 1 where the reaction time varies from about 12 hr to about 28 days.

13. The process of claim 1 where the crystalline aluminosilicate compound is a zeolite which has the structure selected from the group consisting of UZM-4, UZM-5, UZM-5P, UZM-6, UZM-8, and UZM-9.

14. The process of claim 1 where the aluminum source is an aluminum alkoxide and the silicon source is a silicon alkoxide.

15. The process of claim 1 where the CDM reaction mixture is heated to a temperature of about 25° C. to about 100° C. for a time sufficient to remove at least a portion of any alcohol byproducts formed therein.

16. The process of claim 15 where after heating the CDM reaction mixture is aged at a temperature of about 50° C. to about 100° C. for a time of about 2 hr to about 7 days.

17. The process of claim 1 where the aluminum source is alumina and the silicon source is selected from the group consisting of silica sol, fumed silica, precipitated silica and mixtures thereof.

18. The process of claim 1 where the CDM reaction mixture is aged at a temperature of 50° C. to about 100° C. for a time of about 2 hr to about 7 days prior to adding the second solution.

19. A charge density mismatch (CDM) reaction mixture solution comprising sources of aluminum, silicon, optionally an E element and at least one charge density mismatch template which is an organic nitrogen containing compound, in the hydroxide form, having a C/N>4 and selected from the group consisting of quaternary ammonium ions, diquaternary ammonium ions and quaternized alkanolammonium cations; E is selected from the group consisting of gallium, iron, boron and mixtures thereof, wherein the CDM reaction mixture solution is not capable of crystallizing a crystalline aluminosilicate composition at a reaction temperature at which the aluminosilicate synthesis is carried out, which temperature varies from about 75° C. to about 200° C.

20. The CDM mixture of claim 19 further characterized in that it has an empirical formula of:

$$bC_{2/n}O{:}1{-}dAl_2O_3{:}dE_2O_3{:}eSiO_2{:}fH_2O$$

where "b" varies from about 1 to about 25, "d" varies from about 0 to about 1, "e" varies from about 2 to about 50, and "f" varies from about 10 to 5000.

* * * * *

UNITED STATES PATENT AND TRADEMARK OFFICE
CERTIFICATE OF CORRECTION

PATENT NO. : 7,578,993 B2  Page 1 of 1
APPLICATION NO. : 10/978001
DATED : August 25, 2009
INVENTOR(S) : Lewis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Fourteenth Day of September, 2010

David J. Kappos
*Director of the United States Patent and Trademark Office*